(12) United States Patent
Albrecht et al.

(10) Patent No.: US 7,652,843 B2
(45) Date of Patent: *Jan. 26, 2010

(54) COMPLETELY CIRCUMFERENTIAL MOTOR BRACKET SHROUD FOR MOTOR HUB FLANGE OUTSIDE DIAMETER FOR HARD DISK DRIVE

(75) Inventors: David W. Albrecht, San Jose, CA (US); Ta-Chang Fu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1196 days.

This patent is subject to a terminal disclaimer.

(21) Appl. No.: 10/651,191

(22) Filed: Aug. 28, 2003

(65) Prior Publication Data

US 2005/0047000 A1    Mar. 3, 2005

(51) Int. Cl.
*G11B 33/14* (2006.01)
(52) U.S. Cl. .................. 360/97.02; 360/99.08
(58) Field of Classification Search ... 360/97.01–97.03, 360/99.08
See application file for complete search history.

(56) References Cited

U.S. PATENT DOCUMENTS

| 5,631,787 | A  | * | 5/1997 | Huang et al. | 360/97.02 |
| 6,369,977 | B1 | * | 4/2002 | Imai et al. | 360/97.02 |
| 6,507,462 | B1 | * | 1/2003 | Gibbs et al. | 360/264.7 |
| 6,621,658 | B1 | * | 9/2003 | Nashif | 360/97.02 |
| 7,012,782 | B2 | * | 3/2006 | Albrecht et al. | 360/97.02 |
| 7,107,670 | B2 | * | 9/2006 | Fu et al. | 29/732 |

* cited by examiner

*Primary Examiner*—Brian E Miller

(57) ABSTRACT

A completely circumferential shroud is provided around the motor hub flange of a hard disk drive spindle motor. The shroud is continuous, smooth, and uniform, and formed at the same axial height as the flange to reduce air flow disturbances that are generated by the rotating motor hub flange. Unlike prior art designs that provide openings to accommodate the actuator, the present design has no openings or irregular shapes that can cause air flow disturbance. Air flow disturbance, especially when near the actuator arms or head suspensions, can impact track misregistration. In addition, the probability of circulating contamination particles inside the motor out into the disk drive enclosure is also reduced due to less irregular airflow patterns.

11 Claims, 2 Drawing Sheets

COMPLETELY CIRCUMFERENTIAL MOTOR BRACKET SHROUD FOR MOTOR HUB FLANGE OUTSIDE DIAMETER FOR HARD DISK DRIVE

BACKGROUND OF THE INVENTION

1. Technical Field

The present invention relates in general to an improved hard disk drive design and, in particular, to an improved design for a hard disk drive having a motor bracket shroud that completely encircles the outside diameter of the motor hub flange in a hard disk drive.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

One example of a prior art spindle motor 11 for a disk drive is shown in FIG. 1. Motor 11 has a stationary motor bracket 13 and a hub 15 that rotates relative to the bracket 13. The hub 15 has a flange 17 that rotates with the hub 15 at very high rotational speeds (e.g., 10,000 to 15,000 rpm). There is a small radial gap 19 located between bracket 13 and flange 17 to allow rotation. Bracket 13 is also provided with a generally rectangular notch 21 that extends all the way from the outer diameter of the bracket 13 to the radial gap 19, as shown. The notch 21 exposes the outer diameter radial edge 23 of the flange 17. The notch 21 is needed in bracket 13 in order to accommodate a pivot actuator (not shown). The additional space provided by notch 21 is especially critical for high disk count disk drives, which must fit within the same form factor as smaller disk count disk drives.

Unfortunately, the exposure of the outer diameter radial edge 23 of flange 17 abruptly disturbs the flow of air during rotation of the hub 15. The edges of the notch 21 are discontinuous with respect to the bracket 13 as they form a "step" having an axial height differential relative to the flange 17 and edge 23. Thus, the required presence of notch 21 causes air flow disturbances that are generated by the rotating motor hub flange 17. Air flow disturbance, especially when near the actuator arms or head suspensions, can impact track misregistration (TMR). In addition, the notch 21 increases the probability of circulating contamination particles inside the motor 11 out to the disk drive due to the irregular air flow patterns, thereby impeding the performance of the disk drive. Thus, an improved design for attenuating such air flow disturbances thereof would be desirable.

SUMMARY OF THE INVENTION

In one embodiment of the present invention, a completely circumferential or 360° shroud is provided around the motor hub flange of a hard disk drive spindle motor. The shroud is continuous, smooth, and uniform, and formed at the same axial height as the flange to reduce air flow disturbances that are generated by the rotating motor hub flange. Unlike prior art designs that provide openings to accommodate the actuator, the present design has no openings or irregular shapes that can cause air flow disturbance. Air flow disturbance, especially when near the actuator arms or head suspensions, can impact track misregistration (TMR). In addition, the probability of circulating contamination particles inside the motor out to the disk drive is also reduced due to less irregular air flow patterns. This embodiment is most useful in high disk count disk drives.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
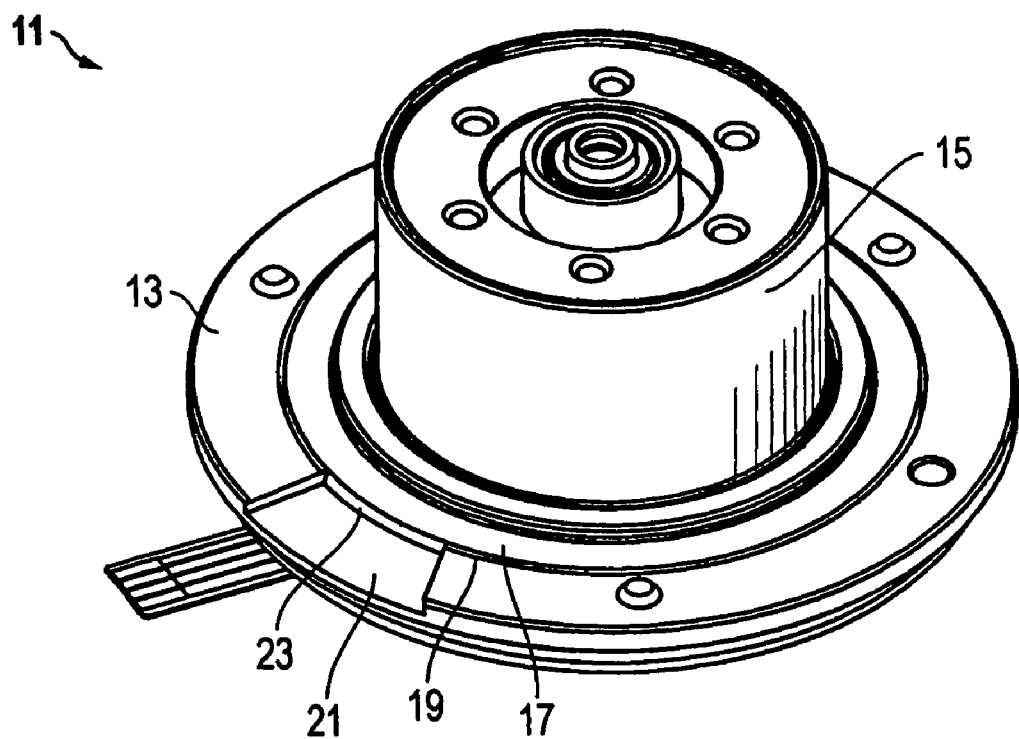
FIG. 1 is an isometric view of a prior art motor and motor bracket for a hard disk drive.
Figure 2:
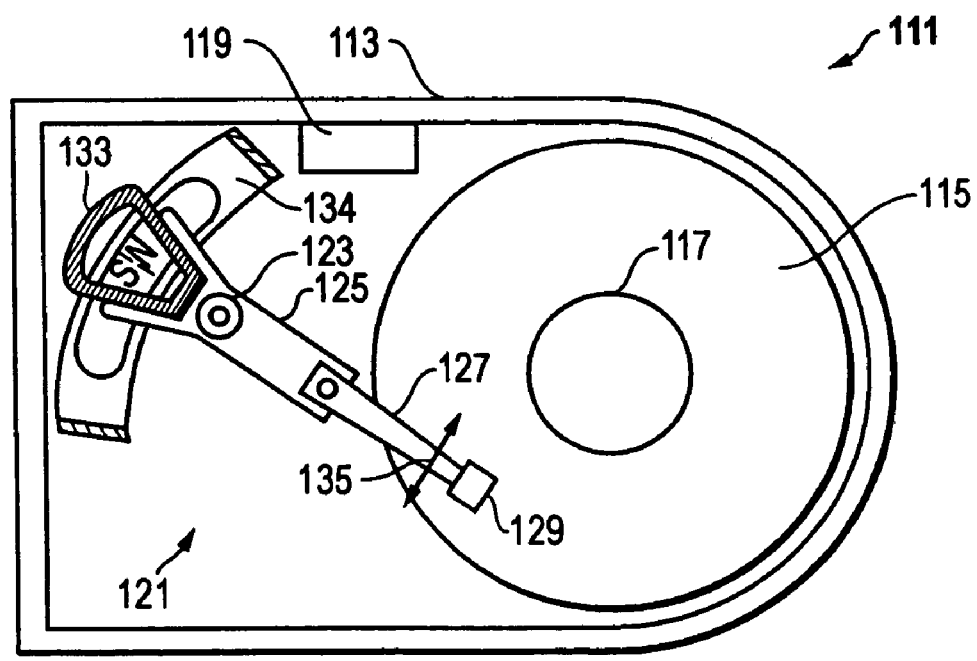
FIG. 2 is a schematic plan view of one embodiment of a hard disk drive constructed in accordance with the present invention.

Referring to FIG. 2, a schematic drawing of one embodiment of an information storage system comprising a magnetic hard disk file or drive 111 for a computer system is shown. Drive 111 has an outer housing or enclosure 113 containing a plurality of stacked, parallel magnetic disks 115 which are closely spaced apart. Disks 115 are rotated by a spindle motor assembly 116 (FIG. 3) having a central drive hub 117. An actuator 121 comprises a plurality of parallel actuator arms 125 (one shown) in the form of a comb that is pivotally mounted to enclosure 113 about a pivot assembly 123. A controller 119 is also mounted to enclosure 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 3:
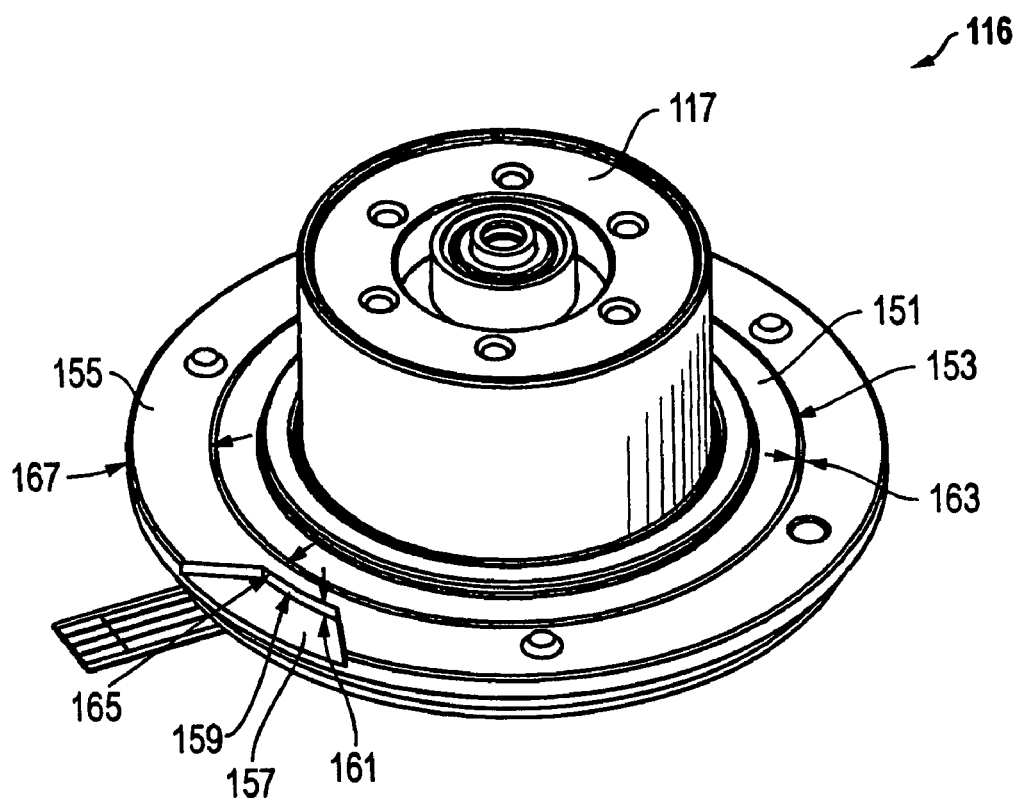
FIG. 3 is an isometric view of one embodiment of a motor and motor bracket for the hard disk drive of FIG. 2 and is constructed in accordance with the present invention.
Figure 4:
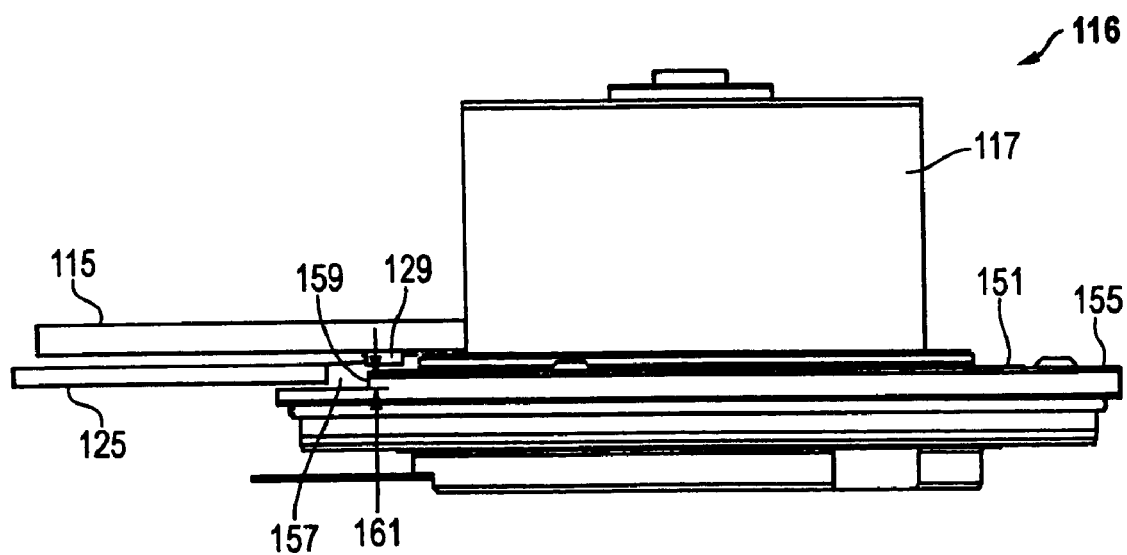
FIG. 4 is a sectional side view of the internal components of the hard disk drive of FIG. 2, including the motor and motor bracket of FIG. 3, and is constructed in accordance with the present invention.

Referring now to FIGS. 3 and 4, the spindle motor assembly 116 has the motor hub 117. The media storage disks 115 are mounted to the motor hub 117 for rotation therewith. In one embodiment, the motor assembly 116 and hub 117 support five media storage disks (one shown in FIG. 4) since the present invention is ideally suited for high disk count disk drives. The motor hub 117 has a flange 151 with an outer diameter radial edge 153.

A bracket 155 is used for mounting the motor assembly 116 to the enclosure 113. The bracket 155 has a notch, depression, or recess 157 formed therein for accommodating a portion of the actuator 121, described above. A shroud 159 is formed on the bracket 155 between the recess 157 and the outer diameter radial edge 153 of the flange 151 of the motor hub 117 for reducing air flow disturbances generated by the flange 151 when it is rotating.

In one embodiment, the shroud 159 has an axial height 161 relative to the motor hub 117 that is approximately equal to an axial height of the flange 151 of the motor hub 117. A radial gap 163 (FIG. 3) is located between the shroud 159 and the flange 151 of the motor hub 117. The recess 157 has a radial dimension 165 (also FIG. 3) that is less than radial dimension 167 of the bracket 155.

In operation, the present invention also comprises a method of reducing air flow disturbances in a hard disk drive. In one embodiment, the method comprises providing an enclosure 113 and a motor 116 having a motor hub 117 and media storage disks 115 mounted to the motor hub 117 for rotation therewith. The motor hub 117 has a flange 151 with an outer diameter radial edge 153. The method also comprises mounting the motor 116 to the enclosure 113 with a bracket 155. The bracket 155 has a recess 157 formed therein for accommodating an actuator 121 (FIG. 2).

In addition, the method comprises shrouding the flange 151 of the motor hub 117 such that at least a portion 159 of the bracket 155 completely circumscribes the outer diameter radial edge 153 of the flange 151 to reduce airflow disturbances in the hard disk drive 111. Alternatively, the shrouding step comprises providing the portion 159 of the bracket 155 with an axial height 161 relative to the motor hub 117 that is approximately equal to an axial height of the flange 151 of the motor hub 117.

The present invention has several advantages, including a completely circumferential or 360° shroud around the motor hub flange of a hard disk drive spindle motor. The shroud is continuous, smooth, and uniform, and formed at the same axial height as the flange to reduce airflow disturbances that are generated by the rotating motor hub flange.

Unlike prior art designs that provide openings to accommodate the actuator, the present design has no openings or irregular shapes that can cause airflow disturbance. Air flow disturbance, especially when near the actuator arms or head suspensions, can impact track misregistration. In addition, the probability of circulating contamination particles inside the motor out to the disk drive is also reduced due to less irregular air flow patterns. This embodiment is most useful in high disk count disk drives.

While the invention has been shown or described in only some of its forms, it should be apparent to those skilled in the art that it is not so limited, but is susceptible to various changes without departing from the scope of the invention.

What is claimed is:

1. A hard disk drive, comprising:
   an enclosure;
   a motor having a motor hub and media storage disks mounted to the motor hub for rotation therewith, the motor hub having a flange with an outer diameter radial edge;
   an actuator mounted to the enclosure for moving read/write heads relative to the media storage disks for reading data from and writing data to the media storage disks; and
   a bracket for mounting the motor to the enclosure, the bracket having a recess formed therein for accommodating a portion of the actuator, and a shroud formed on the bracket between the recess and the outer diameter radial edge of the flange of the motor hub for reducing air flow disturbances generated by the flange when it is rotating.

2. The hard disk drive of claim 1, wherein the shroud completely circumscribes the outer diameter radial edge of the flange.

3. The hard disk drive of claim 1, wherein the shroud has an axial height relative to the motor hub that is approximately equal to an axial height of the flange of the motor hub.

4. The hard disk drive of claim 1, wherein the motor supports five media storage disks.

5. The hard disk drive of claim 1, wherein a radial gap is located between the shroud and the flange of the motor hub.

6. The hard disk drive of claim 1, wherein the recess has a radial dimension that is less than radial dimension of the bracket.

7. A hard disk drive, comprising:
an enclosure;
a motor having a motor hub and media storage disks mounted to the motor hub for rotation therewith, the motor hub having a flange with an outer diameter radial edge;
an actuator mounted to the enclosure for moving read/write heads relative to the media storage disks for reading data from and writing data to the media storage disks; and
a bracket for mounting the motor to the enclosure, the bracket having a recess formed therein that accommodates a portion of the actuator, and a shroud formed on the bracket between the recess and the outer diameter radial edge of the flange of the motor hub for reducing air flow disturbances generated by the flange when it is rotating.

8. The hard disk drive of claim 7, wherein the shroud has an axial height relative to the motor hub that is approximately equal to an axial height of the flange of the motor hub.

9. The hard disk drive of claim 7, wherein the motor supports five media storage disks.

10. The hard disk drive of claim 7, wherein a radial gap is located between the shroud and the flange of the motor hub.

11. The hard disk drive of claim 7, wherein the recess has a radial dimension that is less than radial dimension of the bracket.

* * * * *